Oct. 31, 1939.  R. W. SCHLUMPF  2,177,949
METHOD OF MAKING WEAR RESISTING WELL STRAINERS
Filed March 19, 1936

Robert W. Schlumpf
INVENTOR
BY Jesse R. Stone
ATTORNEY

Patented Oct. 31, 1939

2,177,949

UNITED STATES PATENT OFFICE 2,177,949

METHOD OF MAKING WEAR RESISTING WELL STRAINERS

Robert W. Schlumpf, Houston, Tex., assignor to Hughes Tool Company, Houston, Tex., a corporation of Texas Application March 19, 1936, Serial No. 69,660

4 Claims. (Cl. 29—163.5)

This invention relates to well strainers such as are ordinarily employed in filtering out sand and sediment from the well. It pertains particularly to strainers in which the straining openings are formed in the pipe itself.

It is an object of the invention to make a strainer with wear resisting material at the straining openings so that the strainer will last longer without loss of straining efficiency.

It is another object to provide a strainer with slots or other openings formed therein, said openings being cut through a facing of hard material on the pipe.

The invention includes the method of forming the strainer whereby I am enabled to cut the hard material and then heat treat the same without difficulty.

In the drawing herewith, Fig. 1 is a side elevation of a pipe having a straining slot formed therein according to my invention.

Figure 1:
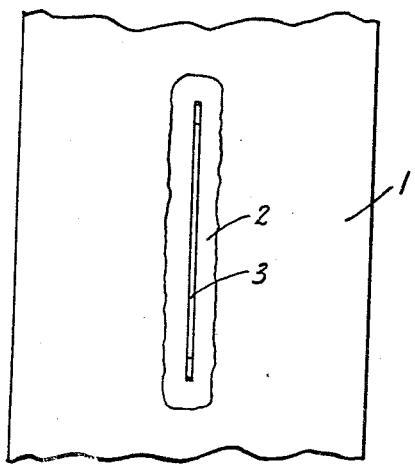
Figure 2:
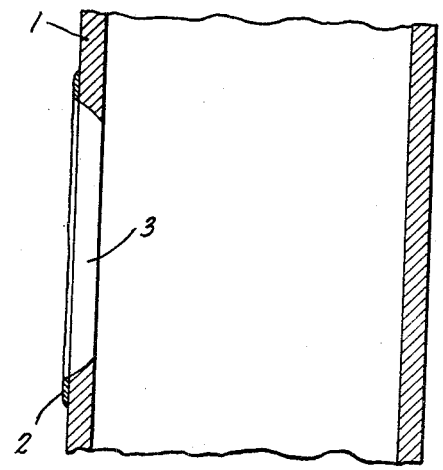
Fig. 2 is a central longitudinal section taken through the straining slot.
Figure 3:
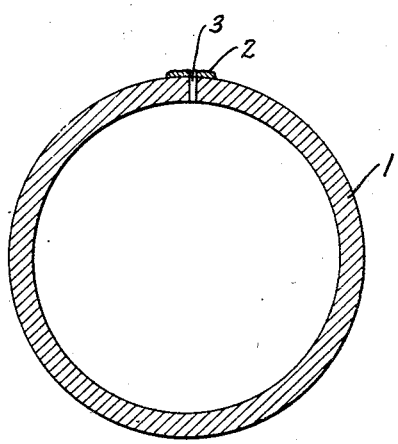
Fig. 3 shows a transverse section through the pipe and slot.

In carrying out the invention a pipe 1, cut to the desired dimensions is employed. Where a straining opening is to be formed, I weld a strip or layer 2 of hard facing material thereon. As this material must be slotted through by a milling cutter, I employ a hard facing material capable of being annealed for cutting. Such materials may be purchased on the market. One very satisfactory material is composed of a large proportion of iron having therein from 20% to 30% of chromium; $\frac{7}{10}$ of one percent of nickel; manganese less than 1%; silicon $\frac{3}{4}$ of one percent to $1\frac{1}{2}\%$, and carbon 2% to $2\frac{1}{2}\%$.

An alloy of these materials is welded on the pipe and then annealed by subjecting the pipe to a heat of approximately 1450° F.; then cooled in the furnace to 1200° F. and then cooled in air.

When thus annealed it may be slotted at 3 with an ordinary milling saw. It must then be heat treated to harden the same. This is done by heating the work to a temperature of about 1750° F. to 1800° F. and then cooling it in air. This will develop a high degree of hardness in the facing about the slot which makes it resistant to wear and abrasion by the sand and similar material carried by the liquid from the well formation. The edges of the slots are sharp, straight and continuous within the hard facing metal. Said hard facing may be built up to any desired depth on the surface of the pipe.

The hard facing material suggested is not only resistant to abrasion, but also to corrosion. The air hardening treatment required to develop a high degree of hardness in the hard alloy, does not harden the material of the pipe to a degree that will impair its ductility. The air hardening treatment also makes it possible to employ long sections of screen pipe without serious distortion.

What I claim as new is:

1. A method of forming well strainers including cutting a section of pipe of the desired length, welding on the outer surface thereof a layer of hard facing material of the desired size, cutting a straining opening in said material and pipe and then heat treating said pipe to harden said material.

2. A method of forming straining openings in pipe including welding a layer of hard material of the character stated upon the area to be slotted, annealing said material, cutting a slot through said material and said pipe, and then heat treating the pipe and material to harden the same.

3. A method of forming straining openings in pipe including welding a layer of hard material of the character stated upon the area to be slotted, annealing said material, cutting a slot through said material and said pipe, then heating the work to about 1800° F. and cooling the same in air.

4. A method of forming straining openings in pipe including welding upon the area to be slotted a layer of hard material including a large proportion of iron alloyed with about 20% chromium, 2% carbon and traces of nickel, silicon and manganese, annealing the same, cutting the slot through said material and said pipe and then heat treating the work.

ROBERT W. SCHLUMPF.